United States Patent [19]

Oliver

[11] Patent Number: 4,968,919

[45] Date of Patent: Nov. 6, 1990

[54] DIFFERENTIAL EAST-WEST PIN-CUSHION DISTORTION CORRECTION CIRCUIT

[75] Inventor: Kirk D. Oliver, Forest Park, Ill.

[73] Assignee: Zenith Electronics Corporation, Glenview, Ill.

[21] Appl. No.: 455,721

[22] Filed: Dec. 18, 1989

[51] Int. Cl.$^5$ .......................................... H01J 29/56
[52] U.S. Cl. .................................................. 315/371
[58] Field of Search ........................................ 315/371

[56] References Cited

U.S. PATENT DOCUMENTS

| | | | |
|---|---|---|---|
| 4,206,388 | 6/1980 | Ishigaki et al. | 315/371 |
| 4,748,384 | 5/1988 | Oliver | 315/371 |
| 4,766,354 | 8/1988 | Oliver | 315/371 |
| 4,794,307 | 12/1988 | Haferl | 315/371 |
| 4,814,104 | 1/1980 | Shouse, Jr. | 315/371 |
| 4,827,194 | 5/1989 | Fernsler | 315/371 |
| 4,845,409 | 7/1989 | Oliver | 315/371 |

Primary Examiner—Theodore M. Blum

[57] ABSTRACT

Circuits are disclosed for increasing the differential pin-cushion distortion on one of the sides of an image on an CRT and simultaneously decreasing the pin-cushion on the other side of the image. In one embodiment of the invention, the circuit comprises a waveform generator for adjustable producing a repetitive control voltage which is the combination of at least one of a ramping voltage, a parabolic voltage, and a sinusoidal voltage and which has a period generally equal to the vertical rate; and a variable clipper to control the output of an automatic phase controller in the horizontal sweep circuit by modulating the slope of the feedback signal sent to the controller as a function of the repetitive control voltage from the waveform generator.

27 Claims, 7 Drawing Sheets

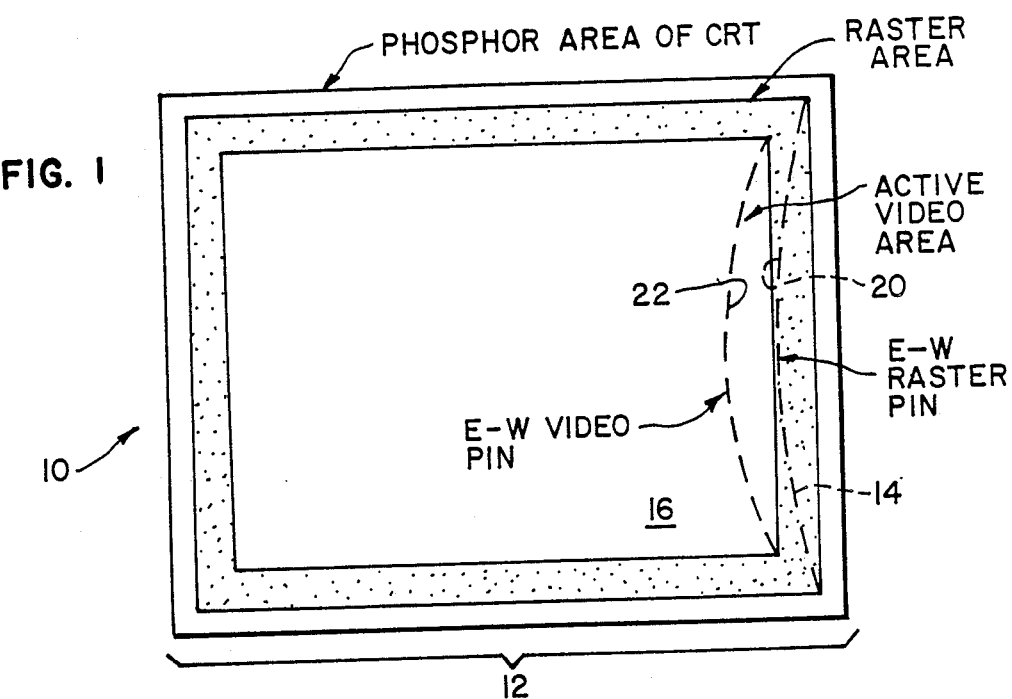
FIG. 1
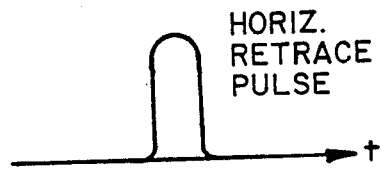
FIG. 2A
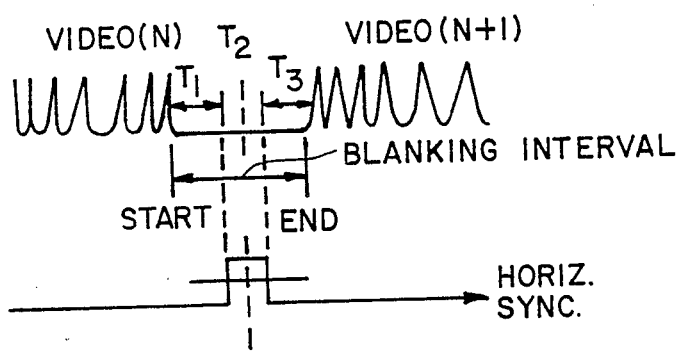
FIG. 2B
FIG. 2C
FIG. 2D

DIFFERENTIAL EAST-WEST PIN-CUSHION DISTORTION CORRECTION CIRCUIT

TECHNICAL FIELD

This invention relates to the general subject matter of video systems and monitors and, in particular, to a circuit for correcting pin-cushion distortion.

BACKGROUND OF THE INVENTION

As is well-known in the television art, the raster or deflection pattern produced on a spherical face of a cathode ray tube (CRT) suffers pin-cushion distortion as a function of the center of curvature of the screen. With non-spherically faced CRT's, the effect of pin-cushion distortion is more pronounced.

With the ever-increasing use of CRT's to display alpha-numeric and precise graphical data, rather than video or picture information, the constraints imposed upon the degree of pin-cushion distortion, miss-convergence and other forms of distortion have become much more rigid. In monitor applications, for example, it is imperative that the edges of the raster be capable of close control (e.g., straightness, size and linearity) to assure a display field having correct dimensions and straight sides.

It has been found that, during the manufacture of monitors, various factors result in imbalanced or differential E-W pin-cushion distortion. These factors include cocked yokes for yamming (i.e., to account for gun misalignment) and yoke winding manufacturing discrepancies. Thus, for example, E-W pin-cushion distortion may result-with one edge of the video being distorted more than the other.

I have addressed the problem of distortions on the top and bottom of a CRT in my U.S. Pat. Nos. 4,845,409; 4,766,354; and 4,748,384 (all of which are assigned to the Zenith Electronics Corporation of Glenview, Ill.). Others have addressed the problem of E-W pin-cushion distortion: U.S. Pat. Nos. 4,794,307 (Raster Distortion Correction for a Deflection Circuit); 4,827,194 (Raster Size Regulating Circuit); and 4,206,388 (Current Control Circuit for Horizontal Deflection Coil of a Television Receiver). For the most part, the prior art has addressed the problem by concentrating on the raster portion of the video display or by modulating the horizontal deflection current flowing through the horizontal deflection coils. Unfortunately, those circuits provide the same amount of correction on both sides of the display so that, if there is a differential, some distortion will remain on one of the sides of the display after the correction is applied. Moreover, correction circuits which have been found to be satisfactory for use in a television display are not necessarily satisfactory when used in connection with a monitor. Thus, an adequate solution has yet to be found to the problem of E-W pin-cushion distortion imbalance, particularly in the context of a video monitor.

OBJECTS OF THE INVENTION

A principal object of the invention is to provide unique E-W pin-cushion correction circuits for a monitor.

One object of the invention is to provide novel E-W pin-cushion correction circuits which allow for adjustment of differential pin-cushion between the two sides of the video display.

Another object of the invention is to provide an improved E-W pin-cushion correction circuit which affects the video display relative to the raster.

Still another aspect of the invention is to provide a new E-W pin-cushion correction circuit which uses a clipper whose output is a function of a control voltage which repeats at the vertical rate and which uses the monitor's APC circuit.

Yet another object of the invention is to provide an E-W pin-cushion correction circuit which affects the raster and thereby the video display.

Numerous other advantages and features of the present invention will become readily apparent from the following detailed description of the invention, the embodiments described therein, from the claims, and from the accompanying drawings.

BRIEF DESCRIPTION OF THE DRAWINGS

FIG. 1 is a pictorial representations of the face of a CRT affected by differential E-W raster and E-W video pin-cushion distortion;

FIGS. 2A through 2D are diagrams showing the relationship between the horizontal synchronization pulse, the video signal, the blanking pulse, and the horizontal retrace pulse;

DETAILED DESCRIPTION OF THE PREFERRED EMBODIMENT

Figure 3A:
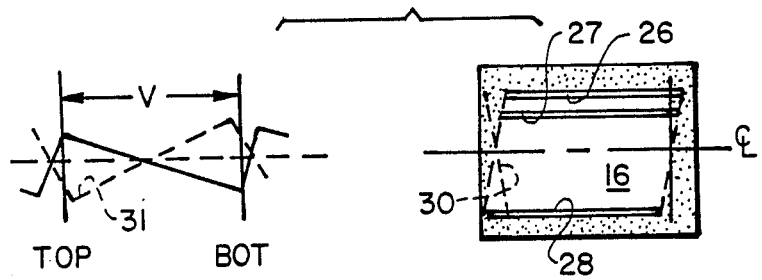
FIGS. 3A through 3C are diagrams depicting waveforms and their effect in modulating a horizontal synchronization signal to correct for E-W pin-cushion distortion.

While this invention is susceptible of embodiment in many different forms, there is shown in the drawings and will herein be described in detail several specific embodiments of the invention. It should be understood, however, that the present disclosure is to be considered as an exemplification of the principles of the invention and is not intended to limit the invention to the specific embodiments illustrated.

Throughout the discussion which follows, it should be understood that the terms "diode", "switch", "capacitor", "multi-vibrator", and "inductor", for example, are used in the functional sense and not exclusively with reference to specific solid-state components, or mechanical structures. Similarly, "circuit" includes one network or a plurality of functionally related networks.

Before describing the invention in detail, the general problem of E-W pin-cushion distortion will be reviewed and the basic principles of the invention will be described.

Turning to FIG. 1, there is illustrated the face of CRT 10. The face or screen of a CRT 10 comprises an area 12 covered with phosphors which are activated by an electron beam. Within the phosphor area the electron beam scans a raster area 14 and within the raster area is an active video area 16. In other words, the active video area 16 is set within the raster 14. Effectively, a blackened or darkened border frames the active video area 16. It may be assumed in the discussion which follows that conventional pin cushion distortion correction means have been applied and that a differential pin cushion distortion remains.

Those skilled in the art recognize that E-W pin-cushion distortion will normally affect the raster as well as the video. FIG. 1 shows a dotted line 20 which begins at the top right hand corner of the CRT face 10, moves towards the center of the screen and then return to the bottom right hand corner. This line 20 illustrates the right hand side or edge of a raster that suffers differential pin-cushion distortion. Ideally, both the left and right edges of the raster 14 should be as straight as possible and that is the effect to be achieved by one embodiment of the present invention. Similarly, there is illustrated a dotted line or edge 22 which proceeds from the top right hand corner of the active video area 16, moves towards the center of the screen and then return to the bottom right hand corner. This line 22 illustrates the appearance of a video display which is effected by differential pin-cushion distortion. Ideally, both the right and left edges of the video area 16 should be straight and that is the effect to be achieved by the other embodiments of the invention. Typically, both sides are distorted unequally; preferably, both sides of the video display and raster should be as straight as possible.

Turning to FIG. 2B, those skilled in the art will recognize that each line of video information is separated by a blanking period during which a horizontal synchronization pulse occurs (see FIG. 2C). Thus, when the electron beam scans the face of a CRT 10, it moves from the left to the right. At the end of the video information, a blanking period begins or starts within which a synchronization pulse occurs which triggers the CRT election beam to return to the left-hand side or edge of the CRT face (see retrace pulse in FIG. 2A). The width, T1+T2+T3, of the blanking period (see FIG. 2B) in relation to width T2 and position of the synchronization pulse effectively determines the position of the beginning and end of video information relative to each side of the raster.

Turning now to FIG. 3A, the right-hand side of FIG. 3A illustrates the face of a CRT wherein the video display has straight right and left sides which are not vertical. The result is a video display which is not rectangular, but one which has the shape of a parallelogram. Looking at the top-most line 26 of the display, that line and its edges or ends can be correctly positioned by causing the video information to end earlier (i.e., increasing the time T1 in FIG. 2B). This is effectively the same as having the retrace pulse (see FIG. 2D) move to the right or to occur later in time relative to the start or beginning of the blanking interval. Similarly, the next line 27 of video information should end earlier in time, but not as early as the previous line. Looking at the last or lowest line of video information 28, that line will be correctly positioned by reducing or shortening the time T1. (see FIG. 1), so that the video is moved further to the right.

The left-hand side of FIG. 3A represents how each line of video information should be moved from the top to the bottom of the face of the CRT and corresponds to the broken line 30 on the right-hand side of the FIG. 3A. In other words, the beginning of the video relative to the beginning of the raster, or the time relationship or phase of the horizontal synchronization pulse (see FIG. 2C) or retrace pulse (see FIG. 2A) relative to the beginning and end of the blanking period (see FIG. 2B), should be modulated from the top to the bottom of the screen as a function of a ramping waveform having a period proportional to the vertical refresh rate.

Figure 3B:
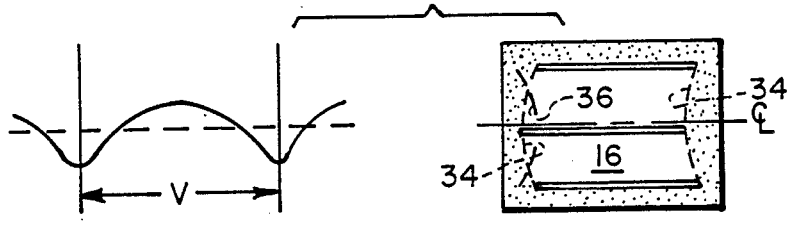

Turning to the right-hand side of FIG. 3B, there is illustrated the face of a CRT wherein the right and left-hand sides of the video are not vertical. In particular, each of the two sides 34 progresses along a curved path from the top to the bottom of the screen after gradually moving towards the middle and left-hand edge of the raster.

From the preceding discussion of FIG. 3A, the right and left-hand sides 34 of the video can be corrected by modulating the position or the beginning of each line of video from the top to the bottom of the face of the CRT as a function of a waveform which causes the video to begin earlier at the top of the screen, later at the middle of the screen, and then earlier at the bottom of the screen. This is depicted by the broken line 36 on the right side of FIG. 3B and the parabolic waveform on the left-hand side of FIG. 3B.

Figure 3C:
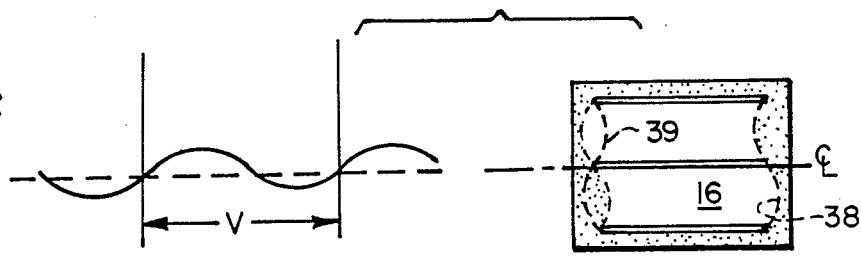

Still another distorted display is illustrated in FIG. 3C. The right-hand side of FIG. 3C illustrates a display wherein the video information, although correctly positioned at the top, middle, and bottom of the screen, progressively starts or begins earlier in time and then later in time as it moves along a curved path across the middle of the screen and towards the bottom of the CRT (see dotted lines 38). Effectively, the edges 38 of the video display progress as a sinusoidal function. Therefore, in accordance with the principles discussed in relationship to FIGS. 3A and 3B, the video image can be corrected by modulating the position of: (1) the retrace pulse relative to the beginning of the blanking interval; or (2) the synchronization pulse relative to the start of the blanking interval in accordance with a sinusoidal waveform or a function whose period is proportional to the vertical rate of the video display. This is depicted by the broken line 39 and the waveform graphically depicted on the left-hand side of FIG. 3C.

It should be understood that an actual CRT or video display may not necessarily have symmetric or uniform distortion on each side of the display. A more realistic situation would be one where the left-hand side of the screen, for example, is bowed more than the right-hand side of the screen. In such a situation, modulating the position of the retrace pulse, for example, relative to the beginning of the blanking interval in accordance with a parabolic function, such as that depicted in FIG. 3B, will not necessarily correct both sides or edges of the video image so that both sides are perfectly straight. In other words, with this type of correction scheme, the picture center line (i.e., a locus of the centers of each line of video) must be fairly straight for balance to be achieved on the right and left sides. In such a case, absolute equivalency of the right and left sides may be obtained. In any case, the result of applying the correction scheme just described will result in reduced distortion and distortion which may be thereafter more uniformly corrected by conventional pin-cushion correction circuits.

It should also be understood that with respect to the foregoing discussion, the distortions depicted are merely exemplary. The parallelogram distortion of FIG. 3A may occur wherein the top line 26 starts earlier in time relative to video imagery having perfectly straight edges. In such a situation, the modulating waveform depicted on the left-hand side of FIG. 3A would be of opposite polarity (i.e., see line 31). The general principles remain the same.

Figure 4:
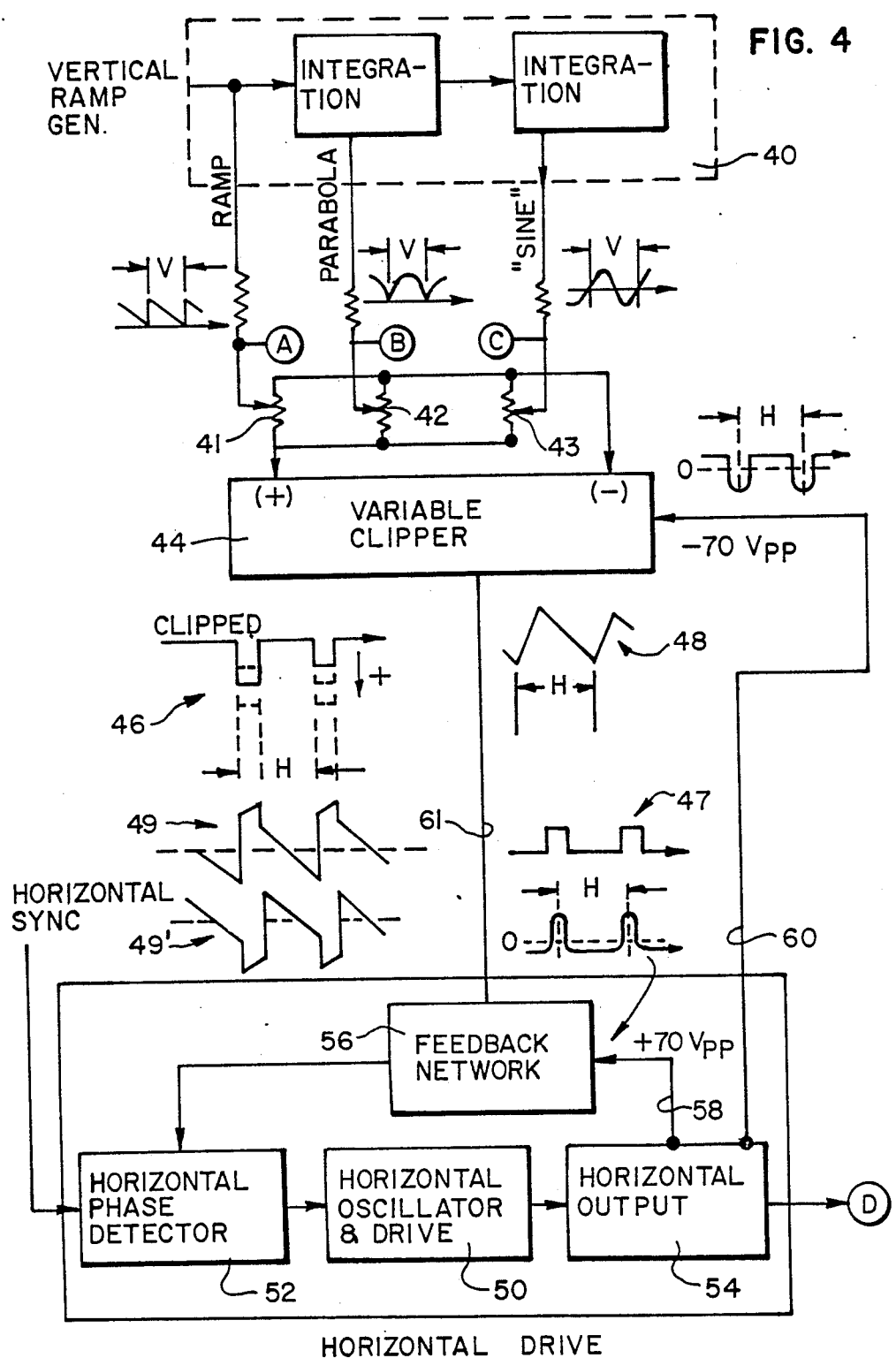
FIG. 4 is a block diagram of one embodiment of the invention.

FIG. 4 illustrates one practical circuit incorporating the basic principles just described and a preferred embodiment of the invention. Those skilled in the art will recall that in a CRT the electron beam is moved in response to the flow of current through horizontal and vertical deflection yokes. By applying sawtooth currents to the horizontal and vertical deflection coils, the electron beam is deflected or scanned over a rectangular area on the face of the CRT. This illuminated area is made up of horizontal scanning lines visible on the active portion 16 of the screen. Synchronization pulses are used to control the horizontal and vertical sweep circuits. Sweep circuits provide current flow in the deflection yokes.

Turning first to the bottom of FIG. 4, a sweep circuit typically comprises a horizontal Oscillator and Drive 50 which is controlled by a Horizontal Phase Detector 52 to keep an internal oscillator running at the proper frequency and in step with the horizontal synchronization pulses. Feedback signals from the Horizontal Output 54 are sent to a Feedback Network 56 to provide a feedback control signal to the Horizontal Phase Detector 52. Typically, two output signals 58 and 60 of opposite polarity are clipped and compared; if there is an amplitude difference, a voltage or control signal is produced by the Horizontal Phase Detector 52 to momentarily raise or lower the frequency of the Horizontal Oscillator, until it is in phase with the horizontal synchronization pulses. For example, in a conventional sweep circuit, horizontal retrace pulses 58 and 60 of opposite polarity would be processed in a Feedback Network 56.

Turning now to the top of FIG. 4, there is illustrated a Waveform Generator 40. The waveform generator comprises a means for providing at least one of a repetitive ramping voltage, parabolic voltage and/or sinusoidal voltage having a period proportional to the vertical rate of the video display. The parabolic voltage and an approximation of a sinusoidal voltage may be obtained from a ramping voltage by integration, and a ramping voltage may be conveniently obtained from the monitor's vertical sweep circuit. Adjustable potentiometers or pots 41, 42, and 43 may be used to selectively adjust the magnitude and polarity of the ramping voltage, the parabolic voltage, and the sinusoidal voltage.

The output from the Waveform Generator 40 is a control voltage which is used to control the output 61 from a Variable Clipper 44. The Variable Clipper 44 functions as a phase modulator to modulate one of the feedback signals 60 as a function of the output from the Waveform Generator 40. In other words, successive feedback pulses are clipped (see arrow 46) at a different level as a function of the output from the Waveform Generator 40. The Variable Clipper 44 sends its output 61 to the Feedback Network 56 where it is functionally compared to the other feedback signal 58. If the positive going pulse train (see arrow 47) predominates relative to the magnitude of the clipper pulse (see arrow 46), the leading edge of the output of the Feedback Network 56, when combined with the horizontal feedback pulse 58 (see arrow 48) in the Feedback Network 56, will result in a signal having a positive leading edge (see arrow 49). If the opposite is true, the resulting signal will have a negative leading edge (see arrow 49'). In any case, the middle of the synchronization pulse will try to align with the zero crossing of the rising edge of resulting signal (49 or 49') and the Horizontal Oscillator and Drive 50 will temporarily speed up or slow down accordingly. This causes the retrace pulse (see FIG. 2D) to occur earlier or later in time and the position of the video, relative to the beginning and end of the raster, will change accordingly.

Figure 5:
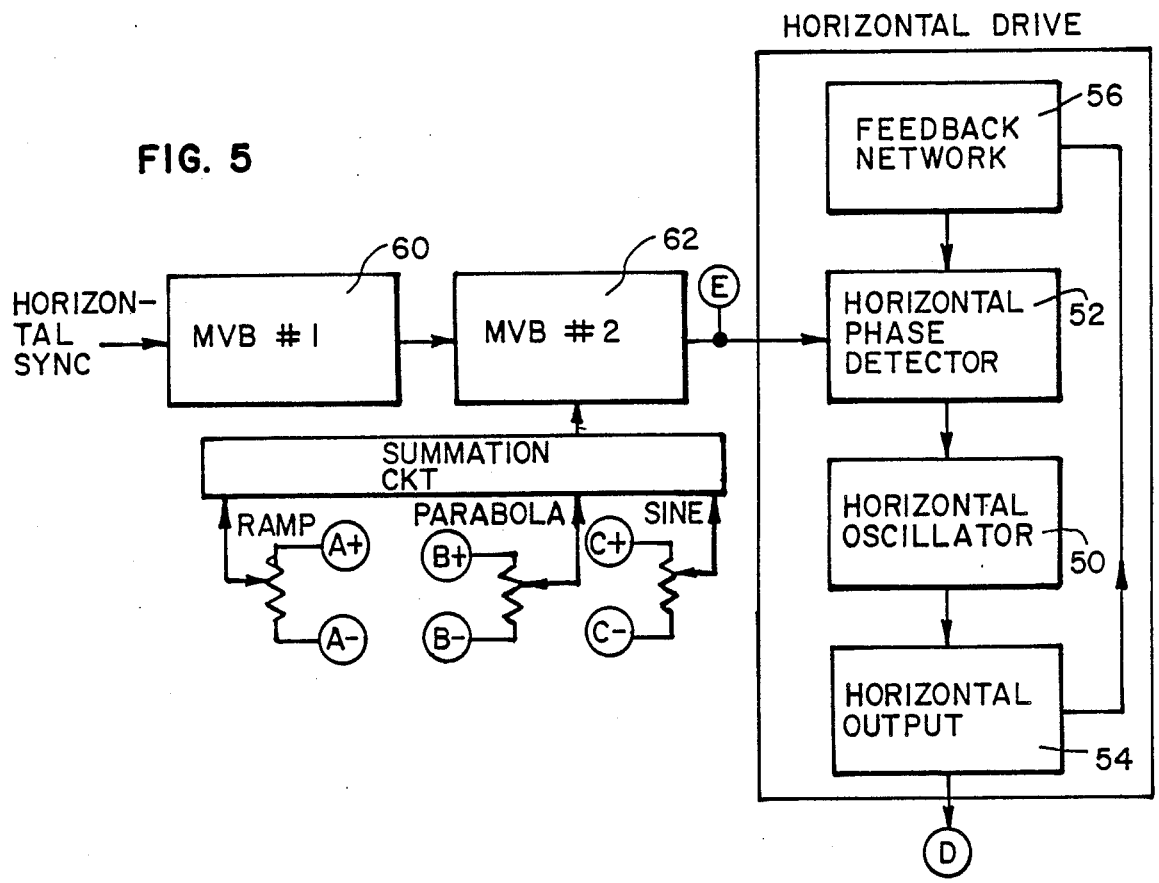
FIG. 5 is a block diagram of another embodiment of the invention.
Figure 5A:
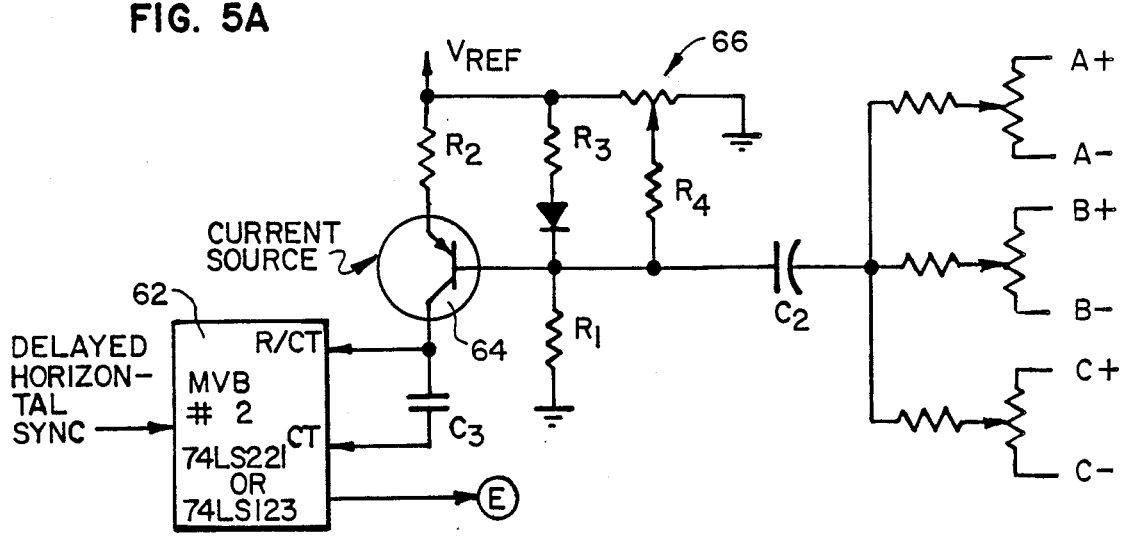
FIG. 5A is a schematic diagram in accordance with block diagram of FIG. 5.

Another embodiment of the invention is illustrated in FIGS. 5 and 5A. In this embodiment, the phase or relative position of the incoming synchronization signal is controlled to displace the video lines in the desired manner. Specifically, the horizontal synchronization signal is sent to two series connected multi-vibrators (MVB) 60 and 62. The first 60 is a one-shot multi-vibrator that runs at a fixed rate and it provides a one-half line delay; the second 62 is an adjustable one-shot multi-vibrator and provides a delay which can be controlled to be somewhat greater or less than one-half line. The second multi-vibrator 62 is operated in response to a control signal resulting from the summation of a ramping voltage "A", a parabolic voltage "B", and a sinusoidal voltage "C", much as that illustrated in the upper half of FIG. 4.

In FIG. 5A, the operation of the second multi-vibrator 62 is controlled by a current source transistor 64. This transistor is driven by at least one of the outputs "A", "B", or "C" from the waveform generator 40 and a manual horizontal phase control 66. The manual horizontal phase control circuit provides for movement of the video with respect to the edges of the raster by a constant or uniform amount from the top to the bottom of the CRT screen. In other words, the horizontal phase control circuit 66 allows static positioning of the video within the raster.

Figure 6:
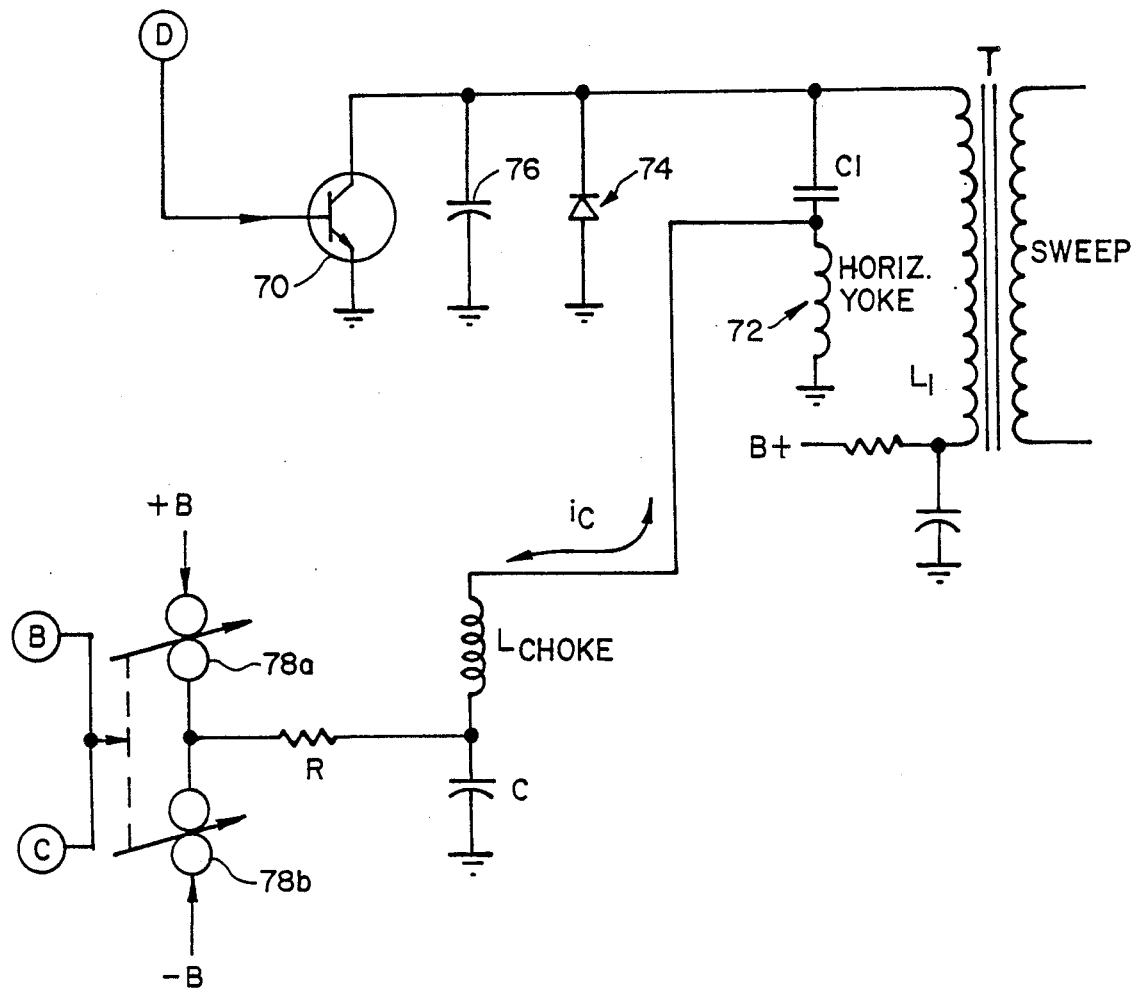
FIG. 6 is a schematic diagram of still another embodiment of the invention.

FIG. 6 illustrates still another embodiment of the invention. Here, the output "D" of a horizontal drive (see FIG. 4, for example) is applied to the base of a switching transistor 70 in a horizontal deflection circuit which further includes a horizontal deflection coil or yoke 72, a damper diode 74, a resonant capacitor 76, and an S-shaping capacitor Cl. A DC voltage B+ is supplied to the horizontal deflection circuit (e.g., capacitor Cl and coil 72) through a coil Ll which is the primary winding of a flyback transformer T. The secondary winding of the flyback transformer T may be rectified to provide a high voltage at an output terminal for application to the anode of the CRT.

To center the raster, a low voltage DC source is used to adjust the amount and direction of DC flow "$i_c$" in the horizontal yoke 72. Here, the direction and amount of current provided to the horizontal yoke 72 is determined by modulating the outputs of two current generators 78a and 78b in response to a control signal obtained from a parabolic waveform "B" and/or a sinusoidal waveform "C". A ramping waveform would not be used because it may cause ringing of the horizontal sweep circuit. Thus, the center of the raster, and along with it the right and left-hand edges of the raster, is modulated from the top to the bottom of the CRT screen as a function of the vertical rate.

Figure 7A:
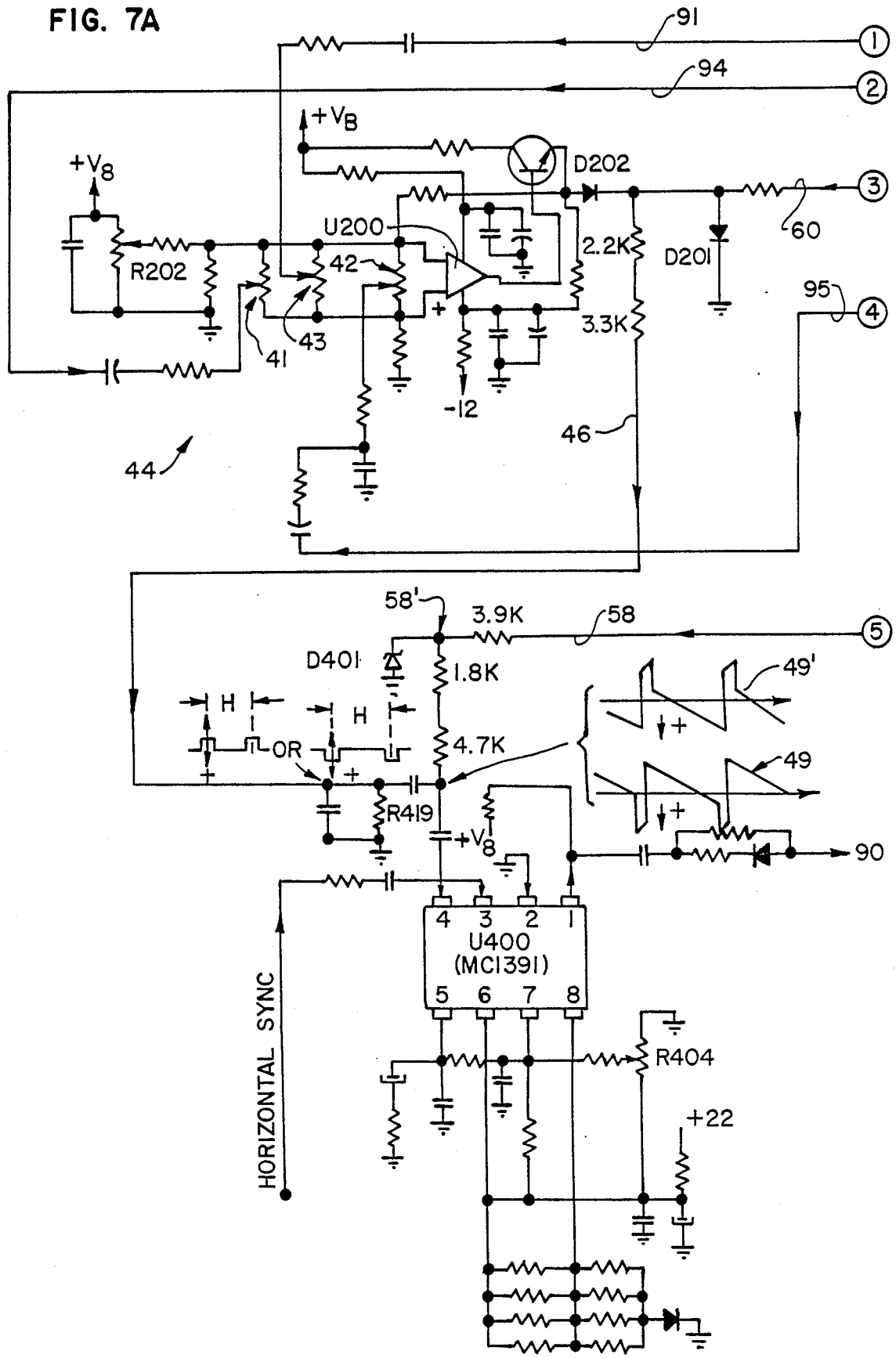
FIG. 7 is an electrical schematic diagram, comprising two halves (FIGS. 7A and 7B) of one practical embodiment of the invention which follows the principles illustrated in FIG. 4.
Figure 7B:
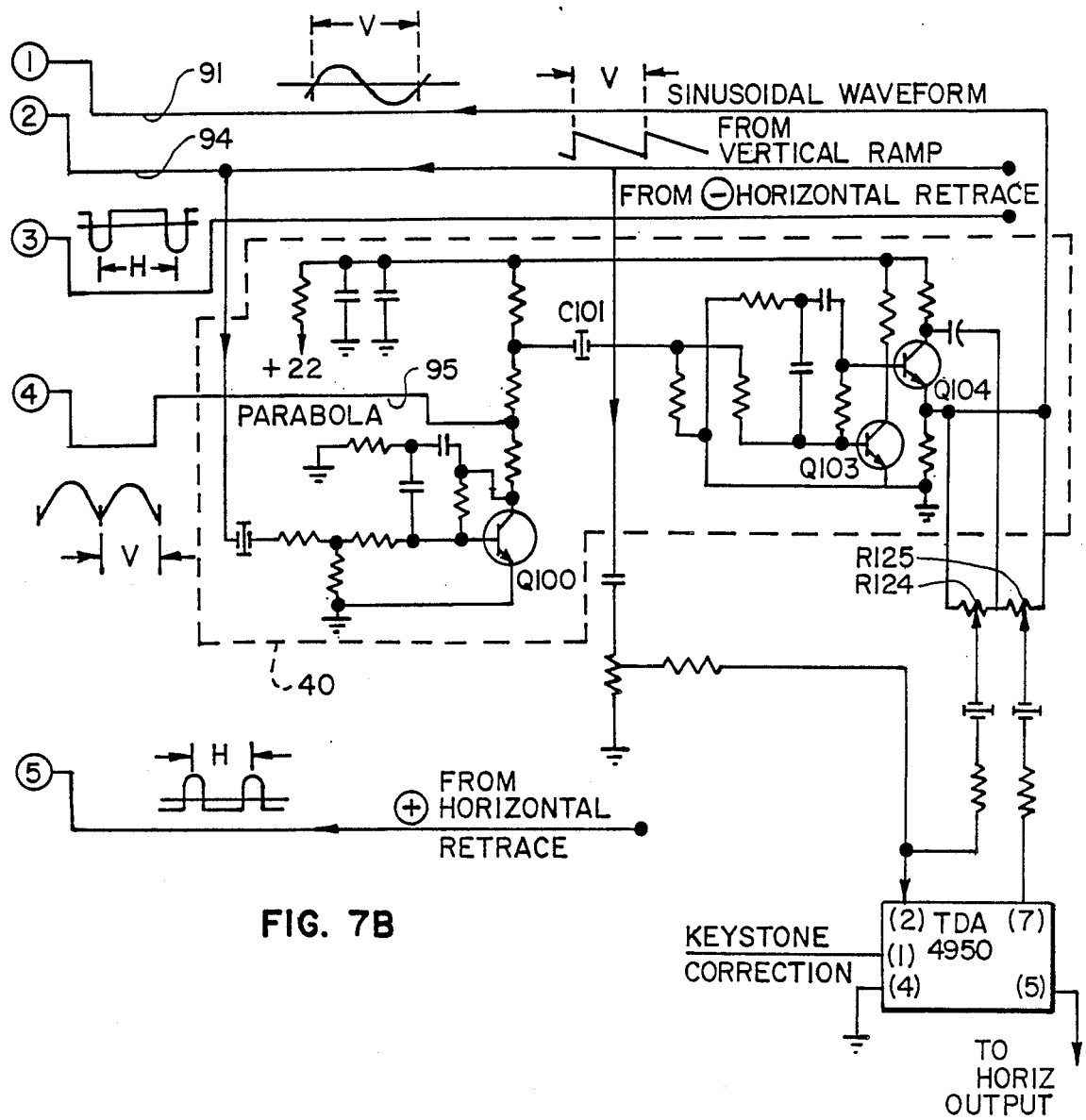
Figure 7:
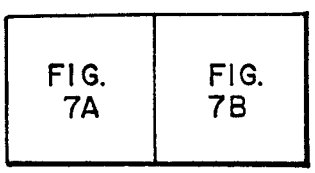

One practical embodiment of the invention is shown in FIGS. 7A and 7B. FIGS. 7A and 7B are two halves of a simplified, partial, schematic diagram for a monitor deflection module incorporating the principles of the invention illustrated in block diagram form in FIG. 4.

FIG. 7B illustrates the internals of the Waveform Generator 40 which, when fed a ramping voltage from a Vertical Ramp Generator, produces a parabolic voltage 95 and an approximation of a sinusoidal voltage 91. Pot R125 is used to adjust the amplitude and polarity of the vertical sinewave injected into the negative feedback of a diode modulation comparator system. Its effect on the CRT screen is a sinewave shape, referred to as E-W "S" correction. Pot R124 is used to adjust the amplitude and polarity of the vertical sinewave that is sent to the wave shaper of the Diode Modulator Driver (TDA4950). Its effect is a second harmonic sinewave correction to the output.

Turning to FIG. 7A, the vertical ramp 94 and the outputs of the Waveform Generator 40 are sent to a Variable Clipper 44 through pots 41, 42, and 43. The Variable Clipper also includes a variable DC voltage input R202 for static positioning of the video within the raster. A Horizontal Processor U400 uses the horizontal synchronization signal, the output from the Variable Clipper 61, a positive horizontal retrace pulse 58 clipped by diode D401 and an internal horizontal oscillator which is adjustable through pot R404. The horizontal oscillator seeks to lock sync to the zero crossing of the rising edge of a modified feedback pulse 49 or 49', obtained from the horizontal retrace, and thereby control the phase of its output 90. A signal proportional to the clipped retrace pulse 58' is added to the rising edge of the horizontal APC ramp (i.e., at R419) and, thereafter, the variable clipped retrace pulse is subtracted from the rising edge of the horizontal APC ramp (see waveforms 49 and 49').

Figure 3D:
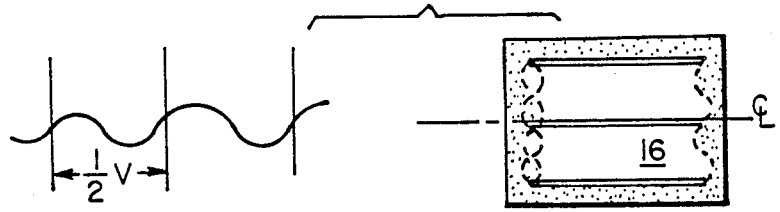
Figure 3E:
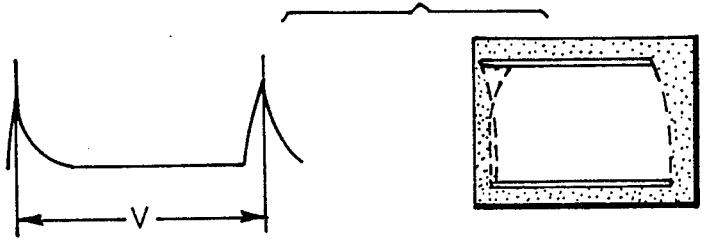

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Thus, certain features of the invention may be utilized independently of other features of the invention. For example, a waveform generator may be used which produces only a sinusoidal voltage or other periodic voltage. Moreover, various changes may be made in the arrangement of parts and equivalent elements may be substituted for those illustrated and described herein. For example, a E-W differential cupidbow correction may be applied by modulating the phase of the horizontal synchronization signal as a function of a sinewave whose period is one-half of the vertical rate (see FIG. 3D). Still another modulating waveform is illustrated in FIG. 3E; this waveform may be useful in correcting yoke cross-talk between the vertical and horizontal windings (e.g., "top hook" distortion). Thus, it will be appreciated that various modifications, alternatives, variations, etc., may be made without departing from the spirit and scope of the invention as defined in the appended claims. It is, of course, intended to cover by the appended claims all such modifications as fall within the scope of the claims.

I claim:

1. In a monitor having a video image on a CRT which is characterized by a vertical rate, which is produced by the monitor as a function of a horizontal synchronization signal and a horizontal retrace pulse, and which is bounded by two opposite sides, a circuit for correcting differential E-W pin-cushion distortion comprising;
   (a) waveform generating means for producing at least one repetitive control voltage whose period is a function of the vertical rate; and
   (b) balancing means, operating at least in response to said at least one repetitive control voltage, for increasing the pin-cushion on one of the sides of the video image and decreasing the pin-cushion on the other side of the video image, said balancing means comprising modulating means for modulating the relative phase of said horizontal synchronization signal and said retrace pulse by said at least one repetitive control voltage.

2. The circuit of claim 1, wherein the monitor produces on the CRT a raster which has a right side and a left side and within which the video image is located;
   wherein the position of the beginning of the video image on the CRT relative to the beginning of the raster is a function of the position of said retrace pulse in its blanking interval; and
   wherein said balancing means changes the position in time of said retrace pulse relative to the beginning and end of said blanking interval from the top to the bottom of the CRT.

3. The circuit of claim 1, wherein the video image comprises a plurality of horizontal video image lines which are progressively scanned across the CRT; and wherein said modulating means comprises:
   (a) first one-shot multi-vibrator means, having as an input said horizontal synchronization signal, for producing a delayed horizontal synchronization signal which is delayed approximately by the one half of the time to scan one horizontal video image line; and
   (b) second one-shot multi-vibrator means, having as an input said delayed horizontal synchronization signal and operated in response to said control voltage, for producing a horizontal synchronization signal whose period is approximately equal to said time to scan one horizontal video image line.

4. The circuit of claim 1, wherein the monitor includes oscillator and output means for producing a horizontal sweep and a retrace across the CRT and includes APC means for automatically phase controlling said oscillator and output means and the time of said sweep as a function of a difference between said horizontal synchronization signal and a feedback signal which is a function of said retrace pulse; and
   wherein said balancing means comprises control means for controlling the operation of said APC means by modulating said feedback signal as a function of said repetitive control voltage.

5. The circuit of claim 4, wherein said oscillator and output means comprises a horizontal oscillator which is operated as a function of a control signal which is obtained from said APC means and which is characterized by a zero crossing of a rising edge whose position in time is a function of said feedback signal.

6. The circuit of claim 4, wherein said control means comprises a variable clipper having an input which is connected to said feedback signal, having a control port which is connected to said control voltage and having an output which is connected to said APC means.

7. The circuit of claim 1, wherein the monitor includes sweep means for producing a horizontal sweep across the CRT using a horizontal oscillator, for producing a positive feedback signal which has a frequency proportional to the rate of said horizontal retrace pulse and for producing a negative feedback signal which has a frequency proportional to the rate of said horizontal retrace pulse;
   wherein the monitor includes a phase detector for providing a control signal to operate said sweep means as a function of the phase difference between said horizontal synchronization signal and a feedback voltage derived from said positive feedback signal and said negative feedback signal; and wherein said modulating means comprises means for modulating one of said positive and said negative feedback signals as a function of said repetitive control voltage.

8. The circuit of claim 1, wherein the monitor includes: sweep means for producing a horizontal sweep across the CRT as a function of a control signal and for producing a feedback signal which has a frequency proportional to the rate of said horizontal retrace pulse and has a waveform characterized by a zero crossing of a rising edge; and a phase detector for providing said control signal to operate said sweep means as a function of the phase difference between said horizontal synchronization signal and said feedback signal; and wherein said balancing means comprises means for changing the slope of said leading edge of said feedback signal as a function of said at least one repetitive control voltage.

9. The circuit of claim 1, wherein said waveform means comprises:
(a) means for repetitively producing a ramping voltage whose period is a function of the vertical rate;
(b) means for repetitively producing a parabola voltage from said ramping voltage; and
(c) means for combining at least one of said ramping voltage and said parabolic voltage to produce said control voltage.

10. The circuit of claim 9, further including:
(d) means for repetitively producing from said parabolic voltage a sinusoidal voltage whose period is a function of the vertical rate, and for combining said sinusoidal voltage with said one voltage to produce said control voltage.

11. The circuit of claim 1, wherein said waveform means comprises:
(a) first generator means for producing a repeating parabola voltage at the vertical rate;
(b) second generator means for producing a sinusoidal voltage from said repeating parabola voltage; and
(c) means for adding said parabola voltage to said sinusoidal voltage to produce said control voltage.

12. The circuit of claim 11, wherein said first generator means comprises means for integrating a ramping voltage whose period is a function of the vertical rate to produce said repeating parabola voltage.

13. The circuit of claim 11, wherein said second generator means comprises means for integrating said repeating parabola voltage to produce said sinusoidal voltage.

14. The circuit of claim 1, wherein said waveform means comprises:
(a) means for producing a ramping voltage whose period is representative of the vertical rate;
b) means for transforming said ramping voltage to produce a periodic parabolic voltage from said ramping voltage;
(c) means for transforming said parabolic voltage to produce a sinusoidal voltage; and
(d) means for adjustably adding together said ramping voltage and said parabolic voltage and said sinusoidal voltage to produce said control voltage.

15. The circuit of claim 1, wherein the video image is produced as a function of a vertical drive circuit and said waveform generating means produces said control voltage from a voltage derived from said vertical drive circuit.

16. The circuit of claim 15, wherein said waveform means comprises means for producing a sinusoidal control voltage which has a frequency which is proportional to twice the vertical rate of said vertical circuit.

17. In a monitor having a raster within which the video image is located and having DC centering control means for providing a DC centering voltage and means for centering the position of the raster and the video image on the CRT as a function of said DC centering voltage, a circuit for correcting differential E-W pincushion distortion comprising:

waveform generating means for producing at least one repetitive control voltage whose period is a function of the vertical rate; and means for modulating the DC centering voltage by said at least one repetitive control voltage to increase the pin-cushion on one of the sides of the video image and to decrease the pin-cushion on the other side of the video image.

18. The circuit of claim 17, wherein the monitor includes a horizontal yoke;

wherein said DC centering control means comprises:
first current generator means for producing DC current flow in one direction through said horizontal yoke, and
second current generator means for producing DC current flow in the opposite direction through said horizontal yoke; and wherein said means for modulating said DC centering voltage by said repetitive control voltage comprises means for simultaneously controlling said first current generator means and said second current generator means as a function of said repetitive control voltage.

19. The circuit of claim 18, wherein said waveform means comprises:

means for integrating a ramping voltage whose period is a function of the vertical rate and producing a parabolic control voltage;

means for integrating said parabolic control producing a sinusoidal control voltage; and means for combining said parabolic and said sinusoidal control voltage to modulate said centering control means.

20. In a monitor producing on a CRT a raster which is characterized by a vertical rate and which is a function of a horizontal retrace signal and producing within the raster a video image which is a function of a horizontal synchronization signal, the position in time of the horizontal synchronization signal pulse relative to a retrace signal pulse defining the horizontal phase of the video image, a circuit comprising:

(a) waveform generating means for adjustably producing a repetitive control voltage which is a function of at least one of:
(1) a ramping voltage which has a period proportional to the vertical rate,
(2) a parabolic voltage which has a period proportional to the vertical rate, and
(3) a sinusoidal voltage which has a period proportional to the vertical rate; and (b) modulating means, operating in response to said waveform generating means, for changing the position of the center of the raster for at least one line of video from the top to the bottom of the CRT.

21. In a monitor producing on a CRT a raster which is characterized by a vertical rate and which is a function of a horizontal retrace signal and producing within the raster a video image which is a function of a horizontal synchronization signal, wherein the position in time of the horizontal synchronization signal pulse relative to a retrace signal pulse defines the horizontal phase of the video image, a circuit comprising:

(a) waveform generating means for adjustably producing a repetitive control voltage which is a function of at least one of:
  (1) a ramping voltage which has a period proportional to the vertical rate,
  (2) a parabolic voltage which has a period proportional to the vertical rate, and
  (3) a sinusoidal voltage which has a period proportional to the vertical rate;
(b) first one shot multi-vibrator means, having as an input the horizontal synchronization signal, for producing a delayed synchronization signal which is delayed by the one half of the time to scan one line of video; and
(c) second one shot multi-vibrator means, having as an input said delayed synchronization signal and operated in response to said control voltage, for producing adjustable synchronization signal pulse whose position in time changes relative to the horizontal synchronization signal pulse for each line of video from the top to the bottom of the CRT.

22. The circuit of claim 20, wherein said repetitive control voltage which is a function of:
(1) a parabolic voltage which has a period generally equal to the vertical rate, and
(2) a sinusoidal voltage which has a period generally equal to the vertical rate.

23. The circuit of claim 20, wherein the monitor includes means for centering the position of the raster on the CRT by controlling the magnitude and direction of a DC current flowing through a CRT horizontal yoke; and
wherein said modulating means comprises means for changing said DC current as a function of said repetitive control voltage.

24. In a monitor which produces on a CRT a plurality of video image lines which are separated in time by blanking intervals and bounded by two ends that have unequal pin-cushion distortion from the top to the bottom of the CRT, which has horizontal oscillator and drive means for producing a horizontal sweep and a retrace across the CRT, which has APC means for automatically phase controlling the horizontal oscillator and drive means as a function of a difference in phase between a horizontal synchronization pulse and a feedback signal having a frequency proportional to the horizontal retrace and having a waveform characterized by a slope, and which has a raster which is characterized by a vertical rate and which is a function of retrace pulses, the relative positions of a horizontal synchronization pulse and a retrace pulse defining the horizontal phase of the video image, a circuit comprising:

(a) waveform generating means for adjustably producing a repetitive control voltage which has a period generally equal to the vertical rate; and
(b) control means for controlling the output of said APC means by modulating the slope of the feedback signal as a function of said repetitive control voltage.

25. The circuit of claim 24, wherein said control voltage is the combination of at least one of a ramping voltage which has a period generally equal to the vertical rate, a parabolic voltage which is derived from said ramping voltage, and a sinusoidal voltage which is derived from said parabolic voltage.

26. The circuit of claim 24, wherein said control means comprises: variable clipper means for clipping said feedback signal as a function of said variable control voltage.

27. In a monitor having a video image within a raster which is characterized by a vertical rate and which bounded by two sides and having phase control means for changing the positions of the video image relative to the edges of the raster, a circuit for correcting differential E-W pin-cushion distortion comprising:

(a) waveform generating means for producing at least one repetitive control voltage whose amplitude is a function of a ramping voltage and whose period is a function of the vertical rate; and
(b) modulating means, operating at least in response to said at least one control voltage, for modulating the output of said phase control means from the top to the bottom of the raster.

* * * * *